United States Patent
Roth

(10) Patent No.: US 6,577,918 B1
(45) Date of Patent: Jun. 10, 2003

(54) PROCESS FOR THE PROCESSING OF SAFETY-RELEVANT DATA

(75) Inventor: Stefan Roth, Eisenbrechtshofen (DE)

(73) Assignee: Kuka Roboter GmbH (DE)

(*) Notice: Subject to any disclaimer, the term of this patent is extended or adjusted under 35 U.S.C. 154(b) by 0 days.

(21) Appl. No.: 09/500,668

(22) Filed: Feb. 9, 2000

(30) Foreign Application Priority Data

Feb. 12, 1999 (DE) .......................... 199 05 841

(51) Int. Cl.$^7$ ............................ G06F 15/173
(52) U.S. Cl. .................. 700/177; 700/4; 700/73; 700/79; 700/249; 702/183; 709/238
(58) Field of Search ................ 700/1, 4, 19, 20, 700/21, 23, 32, 73, 78, 79, 82, 108, 174, 177, 245, 2, 249; 702/57, 183; 709/201, 238, 251; 714/47, 48

(56) References Cited

U.S. PATENT DOCUMENTS

| | | | | |
|---|---|---|---|---|
| 4,653,112 A | * | 3/1987 | Ouimette | 382/128 |
| 4,672,530 A | * | 6/1987 | Schuss | 700/4 |
| 4,827,477 A | * | 5/1989 | Avaneas | 714/757 |
| 5,369,569 A | | 11/1994 | Maeda et al. | 700/79 |
| 5,508,689 A | * | 4/1996 | Rado et al. | 340/3.1 |
| 5,566,092 A | * | 10/1996 | Wang et al. | 700/159 |
| 6,233,704 B1 | * | 5/2001 | Scott et al. | 709/200 |
| 6,307,652 B1 | * | 10/2001 | Fassih-Nia et al. | 359/110 |
| 6,347,252 B1 | * | 2/2002 | Behr et al. | 700/2 |
| 6,381,647 B1 | * | 4/2002 | Darnell et al. | 709/232 |
| 6,385,562 B1 | * | 5/2002 | Roth et al. | 702/188 |
| 6,424,870 B1 | * | 7/2002 | Maeda et al. | 700/4 |
| 6,480,473 B1 | * | 11/2002 | Chambers et al. | 370/253 |

FOREIGN PATENT DOCUMENTS

| | | |
|---|---|---|
| DE | 4335116 | 4/1994 |
| DE | 4416795 | 11/1995 |
| EP | 0837394 | 4/1998 |
| EP | 0287992 | 10/1998 |

* cited by examiner

Primary Examiner—Leo Picard
Assistant Examiner—Paul Rodriguez
(74) Attorney, Agent, or Firm—McGlew and Tuttle, P.C.

(57) ABSTRACT

For optimizing data processing in a safety system for a machine, such as a robot or the like, while permitting a simple, safety-uncritical diagnosis, the invention provides a process for processing safety-relevant data in a safety system for a machine, such as a robot or the like, with several nodes connected in a ring and which is characterized in that in parallel in each node are processed the data received by it, which are retransmitted to the next node and for diagnosis purposes a diagnostic unit is provided which passively receives the data present in at least one node.

4 Claims, 2 Drawing Sheets

PROCESS FOR THE PROCESSING OF SAFETY-RELEVANT DATA

FIELD OF THE INVENTION

The invention relates to a process for processing safety-relevant data in a safety system for a machine, such as a robot or the like.

BACKGROUND OF THE INVENTION

Hitherto data have always been collected and processed in a mainframe computer in bus-based safety devices for machines, such as robots or the like. In order to bring about a reaction, the results calculated in the mainframe computer are then redistributed to the bus. A communication information loss more particularly occurs because in order to ensure acceptable reaction times the data-complex systems must be compressed firstly due to the transmission and secondly due to the calculation.

It is also necessary to adapt the evaluating system, i.e. the mainframe computer to a bus extension or upgrading, particularly with respect to buffer stores. In the case of an upgrading the buffer stores must be extended, so that all the information necessary for evaluation can be collected from the bus. The mainframe computer must be able in a given time to calculate the output process pattern from the input process pattern determined. In addition, diagnostic devices can influence the safety circuit, so that there is a need to subject the diagnostic device to safety checks, because said data can be manipulated on the bus and can therefore influence the reliable functioning of the system. For the installation of a diagnostic unit, it is finally necessary to act in the ring configuration of the safety bus. For diagnosis purposes the said bus must be so reconfigured that the diagnostic unit is accepted as an additional party or subscriber in the ring. This leads to a safety risk, which must be checked and eliminated. Thus, known safety devices are not optimized for the given safety applications.

The problem of the invention is therefore to further develop a process of the aforementioned type so that, whilst avoiding the indicated disadvantages, an optimization takes place with respect to the safety applications, whilst creating a simple diagnosis possibility.

SUMMARY OF THE INVENTION

In a process of the aforementioned type, the invention solves the above problem in that in parallel in each node the data received therefrom are processed and retransmitted to the next node.

According to a preferred development for diagnosis purposes a diagnostic unit passively receives the data present in at least one node.

Transmitting and receiving and/or evaluating data takes place simultaneously on all nodes until all data of a ring communication are processed, but the nodes do not process identical data. Instead each node processes data transferred to it from the preceding node at the same time as the other nodes and said data can differ from node to node.

As a result of the invention there can be a connection between two nodes and each node itself independently of other nodes of the annular or ring-like bus. All the individual connections of the ring between two nodes are operated simultaneously or in parallel and in the nodes the informations present there are processed simultaneously or in parallel. For each virtually simultaneous single connection the communicated information is loaded with an information already known beforehand to the node on the basis of its nature. The information content remains distributed over the entire annular bus. Thus, there is no information loss during tying of a cyclic data packet. The ring structure of the medium is therefore used as a simultaneously constantly updated memory for all the process data present in the bus. There is no need for an individual memory for the information in the single node. All subscribers access the same data of the ring communication and evaluate same in a redundant manner. Thus, a connected diagnostic unit can evaluate all the data without having itself to observe communication or safety functions, because the process pattern communicated in the ring is quasi-simultaneously updated.

There is no need for the combination and compression of data, so that there is no information loss with respect to the safety-relevant data on the ring bus. The communication containing all the safety-relevant informations of the ring bus, need not be influenced for diagnostic purposes. Thus, a diagnostic unit does not have to deposit its own instructions on the bus. It can obtain all the informations necessary for it by mere contact at the bus, i.e. as a "monitor". The diagnostic unit cannot manipulate bus data and consequently needs no safety-relevant package. For contacting the diagnostic unit there is no need to break open the safety system and the diagnostic unit does not have to be configured with additional subscribers.

There is no need to adapt a mainframe computer on extending the ring bus safety system, because optionally an additional subscriber (node) as such provides the entire resources necessary (computers, memories).

As a result of the process according to the invention the communication duration for a ring communication is scarcely lengthened compared with the prior art and can in fact be reduced as a result of the parallel data processing and data retransmission.

BRIEF DESCRIPTION OF THE DRAWINGS

Further advantages and features of the invention can be gathered from the claims and following description of an embodiment of the invention and with reference to the attached drawings, wherein show:

DETAILED DESCRIPTION OF THE DRAWINGS

Figure 1:
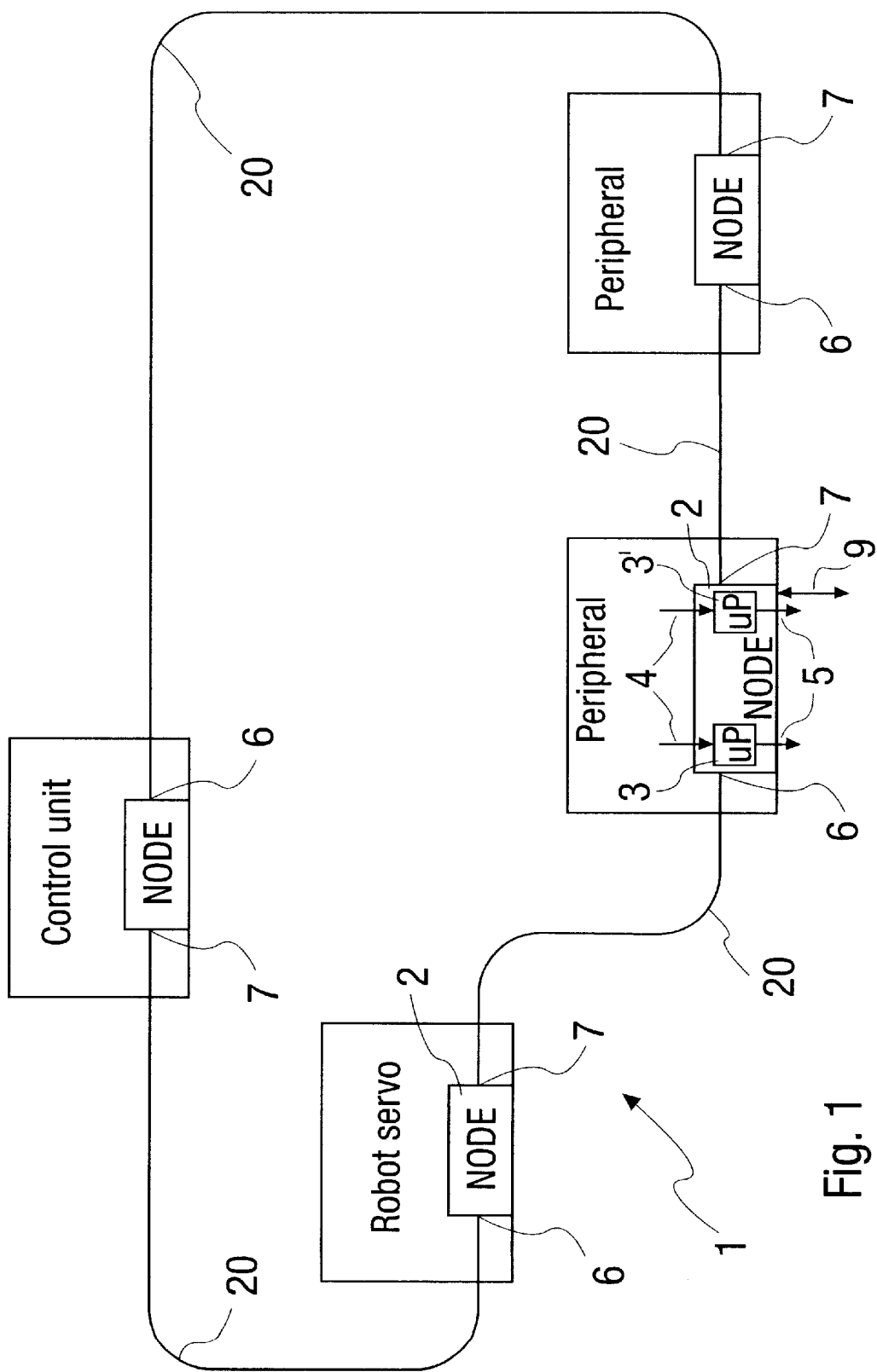
FIG. 1 A diagrammatic representation of a safety system with ring bus configuration according to the invention.

FIG. 1 shows a safety system with a ring bus configuration. The safety system 1 has a ring with interconnected, substantially identical nodes 2. Each node 2 has in redundant form two microprocessors 3, 3', which perform identical safety links or connections and consequently monitor one another. Each node has in two-channel form safety-relevant inputs 4 in order to read in safety-relevant signals. With the two-channel design of the inputs 4, each microprocessor of a node has a channel of the input signal. Each node 2 also has in two-channel form safety-relevant outputs 5, in order to control safety-relevant control elements or actuators of the machine to be monitored, such as a robot, in general so as to bring about an emergency release. The safety-relevant inputs are evaluated in parallel by both microprocessors.

In addition, each node has al incoming, serial interface 6 and a relaying, serial interface 7. The serial interfaces are designed in such a way that they can transmit in parallel one byte, i.e. 8 bits over serial lines 20. Finally, the nodes also have informal inputs 9 for diagnosis, indication error or the like.

A safety ring formed in this way can be linked with identically formed safety rings, either directly or by means of an interposed ring, which performs no monitoring and control functions for the machine to be monitored, but instead as a master or supervisor ring merely provides a connection between several safety rings (such as e.g. with several robots in a working unit). Thus, several robots can be connected to a single safety element or cell.

Figure 2:
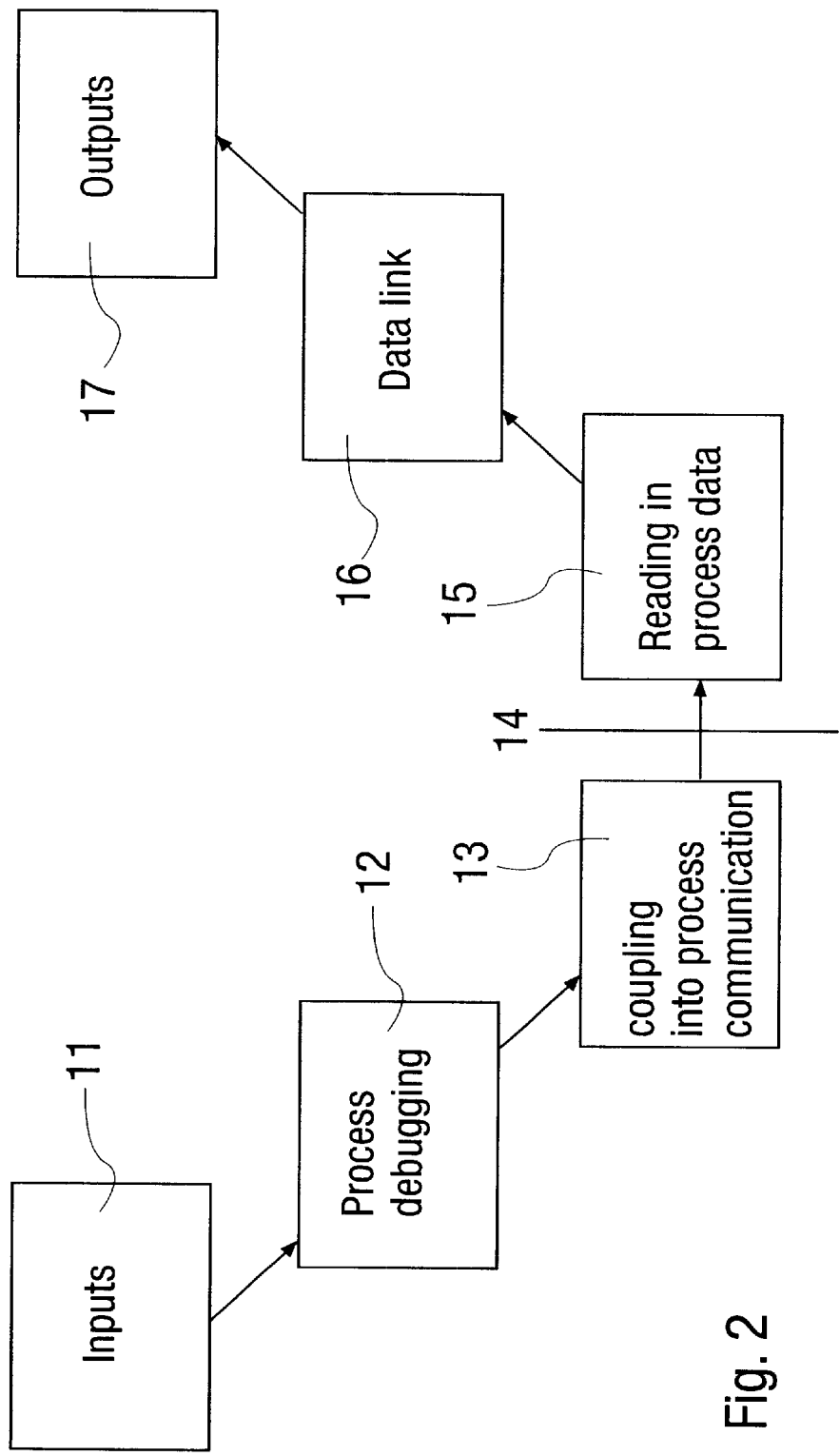
FIG. 2 The information flow in a node in accordance with the present invention.

Whereas hitherto the information flow has taken place in such a way that by means of a slave node the relevant safety information of the machine is received, coupled into the process communication and relayed to a central data processing unit, such as a master node in the form of a stored-program control (SPC), etc., where processing thereof takes place, followed by delivery to the communications ring and following the reading of the process data in the slave node the corresponding output was controlled, in the invention and in accordance with FIG. 2 in the particular node by the reception of the input signals 11 there is a process debugging 12 thereof and a coupling into the process communication 13 and after reading the process data 15 from the ring communication 14 the data linkage 16 immediately takes place and the safety-relevant output 17 is optionally controlled.

Thus, processing processes can take place in parallel in nodes present in the annular safety system. As a result of the parallelism of the communication, communication can take place with uncompressed data, which are necessary for diagnosis.

Parallel data processing is illustrated in table 1. Unlike in the conventional procedure, all data packets in a line are evaluated in each step (after each line). Each line in Table 1 is referred to herein as a step. Each controller processes in a line precisely one data volume or packet of an external controller. Thus, the individual microcontrollers only require one memory for said single data volume. Thus, the memory is independent of the ring length.

Communication operates with the reflex in the individual microcontroller, which means that each slave controller has stored the next data packet to be transmitted in the transmitting buffer (i.e. other data) before it receives the next data packet. This makes it possible to immediately transmit data at the instant when it is recognized that data are being received. Thus, transmitting and receiving are substantially parallelized. The reaction and signal transit times between the individual controllers give rise to an offset. However, as the reaction times of the controllers are much shorter than the time necessary for a complete transmission of a data packet (a box in the table), there is a substantial parallelism. Thus, there is parallel data communication of all nodes with different data contents (see table), but equally long data packets.

Thus, the ring communication comprises single communications with their evaluation (lines 1 to 14 of the table) in hard order. The sum of the reflex times for this is not relevant. The signal transit times are also irrelevant. This process continues in parallel until the entire ring communication is ended. Only after this complete ring communication are the controller internal data evaluated and monitorings processed, following line 14 in Table 1 (not shown). This also takes place simultaneously. There is a minimum offset due to the sum of the reaction times. This sum corresponds to I/nth of the time required in order to transmit a single data item once round the ring. In this n represents the number of participating controllers, i.e. double the number of nodes.

Following a ring communication all parties have quasi-simultaneously or substantially simultaneously received at the end of said communication all the data necessary for updating all the inputs and outputs. This also takes place substantially in parallel at all the nodes after the controller-internal data evaluation and the procession of monitorings. Then the master starts with the communication again. Here and at this point there can be an additional waiting time with very long bus systems. This is the difference between the data processing time in the master and the time by which the first data packet of the old ring communication was delayed by the accumulated reaction times.

Thus, if a byte is received, initially the prepared, i.e. previously processed output word is sent. The received word is then evaluated and the next output word prepared. Thus, the entire ring communicates substantially simultaneously. The first line of table 1 gives the node number. A and B differentiate the two microprocessors in the particular node. The index n is used for the node number (in the example n is equal to zero to four). The designation n' stands for the first connection or linkage result of the nth node and n stands for the process-debugged input data word of the nth node.

TABLE 1

| Line | 0A | 0B | 1A | 1B | 2A | 2B | 3A | 3B | 4A | 4B |
|---|---|---|---|---|---|---|---|---|---|---|
| 1 | 0A | 0B | 1A | 1B | 2A | 2B | 3A | 3B | 4A | 4B |
| 2 |  | 0A |  | 1A |  | 2A |  | 3A |  | 4A |
| 3 | D0A | 0' | D1A | 1' | D2A | 2' | D3A | 3' | D4A | 4' |
| 4 | 4 | D0 | 0 | D1 | 1 | D2 | 2 | D3 | 3 | D4 |
| 5 | D4 | 4 | D0 | 0 | D1 | 1 | D2 | 2 | D3 | 3 |
| 6 | 3 | D4 | 4 | D0 | 0 | D1 | 1 | D2 | 2 | D3 |
| 7 | D3 | 3 | D4 | 4 | D0 | 0 | D1 | 1 | D2 | 2 |
| 8 | 2 | D3 | 3 | D4 | 4 | D0 | 0 | D1 | 1 | D2 |
| 9 | D2 | 2 | D3 | 3 | D4 | 4 | D0 | 0 | D1 | 1 |
| 10 | 1 | D2 | 2 | D3 | 3 | D4 | 4 | D0 | 0 | D1 |
| 11 | D1 | 1 | D2 | 2 | D3 | 3 | D4 | 4 | D0 | 0 |
| 12 | 0 | D1 | 1 | D2 | 2 | D3 | 3 | D4 | 4 | D0 |
| 13 | D0 | 0 | D1 | 1 | D2 | 2 | D3 | 3 | D4 | 4 |
| 14 | 4 old | D0 old | 0 old | D1 old | 1 old | D2 old | 2 old | D3 old | 3 old | D4 old |
| 1 | 0A | 0B | 1A | 1B | 2A | 2B | 3A | 3B | 4A | 4B |
| 2 |  | 0A |  | 1A |  | 2A |  | 3A |  | 4A |
| 3 | D0A | 0' | D1A | 1' | D2A | 2' | D3A | 3' | D4A | 4' |

TABLE 1-continued

| Line | 0A | 0B | 1A | 1B | 2A | 2B | 3A | 3B | 4A | 4B |
|---|---|---|---|---|---|---|---|---|---|---|
| 4 | 4 | D0 | 0 | D1 | 1 | D2 | 2 | D3 | 3 | D4 |
| 5 | D4 | 4 | D0 | 0 | D1 | 1 | D2 | 2 | D3 | 3 |
| 6 | 3 | D4 | 4 | D0 | 0 | D1 | 1 | D2 | 2 | D3 |
| 7 | D3 | 3 | D4 | 4 | D0 | 0 | D1 | 1 | D2 | 2 |
| 8 | 2 | D3 | 3 | D4 | 4 | D0 | 0 | D1 | 1 | D2 |
| 9 | D2 | 2 | D3 | 3 | D4 | 4 | D0 | 0 | D1 | 1 |
| 10 | 1 | D2 | 2 | D3 | 3 | D4 | 4 | D0 | 0 | D1 |
| 11 | D1 | 1 | D2 | 2 | D3 | 3 | D4 | 4 | D0 | 0 |
| 12 | 0 | D1 | 1 | D2 | 2 | D3 | 3 | D4 | 4 | D0 |
| 13 | D0 | 0 | D1 | 1 | D2 | 2 | D3 | 3 | D4 | 4 |
| 14 | 4 old | D0 old | 0 old | D1 old | 1 old | D2 old | 2 old | D3 old | 3 old | D4 old |

Table 1 shows two complete communications, in which the protocol is five subscribers long and in each node two data packets are produced. The symbols in the table boxes represent the transmission data of the particular microprocessor. A column shows which data are serially transmitted. Thus, OA or OB stands for the process datum transmitted by the first or second microprocessor of the first node. O' stands for the result of the first comparison of the two-channel nature. O stands for the result of the merging of the first comparison result and a second comparison result, i.e. the process datum. The second comparison result arises in the node. It is not communicated and consequently does not appear in the table. DOB occurs in node OB and does not have to be communicated for summarizing the total datum DO. DO contains information data without safety functions, whereas the process datum O contains informations to be evaluated from the safety standpoint. Process datum O is retransmitted from said node, via the next node to the annular safety system and therefore to all the nodes (diagonal passing downwards from line 4, column 1).

DOA stands for the informal data packet determined by the first microprocessor, whilst the informal data packet DOB determined by the second microprocessor of the first node is not shown. Instead of this in line 4, column OB are given the data of the complete first node formed from the sum of the aforementioned data packets (DO).

The corresponding data (process datum n, with n equal to zero to four) informal data DnA of each core with n equal to zero to four are delivered through the total annular safety system, as is apparent from the path of the data along the diagonal, each line representing a point of time.

The determined data can be taken from each of the nodes by a diagnostic unit without the latter acting in the data flow or the processing by active manipulations such as in the form of instructions, so that there is no possibility of a safety risk through the diagnosis.

What is claimed is:

1. A process for processing safety-relevant data in a safely system for a machine with several machine part control nodes, the process comprising the steps of:

providing each control node with a microprocessor and data memory;

connecting the nodes with plural channel inputs providing redundant safety-relevant data;

connecting plural channel safety-relevant outputs to control safety-relevant control elements;

providing serial lines;

connecting each node to another node to one of the lines via an income serial interface and connecting each node to another one of the lines via a relaying serial interface to form a bus ring with connected nodes;

at each node receiving safety-relevant data at the plural channel inputs and processing the received safety-relevant data, the processing taking place in parallel at the respective nodes;

upon processing received safety-relevant data, each node transmitting processed data to a next node around the bus ring via the relaying serial interface and simultaneously receiving processed data from another node of the bus ring via the incoming serial interface.

2. A process according to claim 1, further comprising providing a diagnosis unit and using the diagnostic unit to passively receive data present in at least one node.

3. A process for processing safety-relevant data in a safety system for a machine with several machine part control nodes, the process comprising the steps of:

providing each control node with dual microprocessors and a data memory;

connecting the nodes with a plural channel inputs providing redundant safety-relevant data;

connecting plural channel safety-relevant outputs to control safety-relevant control elements;

providing serial lines;

connecting each node to another node to one of the lines via an incoming serial interface and connecting each node to another one of the lines via a relaying serial interface to form a bus ring with connected nodes;

at each node receiving safety-relevant data and processing the received safety-relevant data in parallel at each of the dual microprocessors, the processing taking place in parallel at the respective nodes, wherein the safety-relevant data received by each node is different in content from data received simultaneously at another node;

upon processing received safety-relevant data, each node transmitting processed data to a next node around the bus ring via the relaying serial interface and simultaneously receiving processed data from another node of the ring via the incoming serial interface.

4. A process according to claim 3, wherein for diagnosis use is made of a diagnostic unit which passively receives said data present in at least one node.

* * * * *